(12) United States Patent
Liezenberg et al.

(10) Patent No.: US 7,783,709 B2
(45) Date of Patent: Aug. 24, 2010

(54) E-MAIL WITH VISUAL OBJECT METHOD AND APPARATUS

(75) Inventors: Michiel Laurens Jakob Liezenberg, Haarlem (NL); Vincent Jansen, The Hague (NL)

(73) Assignee: Followflow B.V., Abcoude (NL)

( * ) Notice: Subject to any disclaimer, the term of this patent is extended or adjusted under 35 U.S.C. 154(b) by 1305 days.

(21) Appl. No.: 11/160,795

(22) Filed: Jul. 8, 2005

(65) Prior Publication Data

US 2007/0011265 A1 Jan. 11, 2007

(51) Int. Cl.
*G06F 15/16* (2006.01)
(52) U.S. Cl. ............... 709/206; 709/203; 709/205; 709/207; 715/203; 715/234; 715/810; 707/10
(58) Field of Classification Search ........... 709/206, 709/203, 205, 207; 707/10; 715/203, 234, 715/810
See application file for complete search history.

(56) References Cited

U.S. PATENT DOCUMENTS

| | | | | |
|---|---|---|---|---|
| 6,959,382 | B1 * | 10/2005 | Kinnis et al. | 713/170 |
| 2002/0107931 | A1 * | 8/2002 | Singh et al. | 709/206 |
| 2003/0001875 | A1 * | 1/2003 | Black et al. | 345/708 |
| 2008/0060052 | A1 * | 3/2008 | Hwang et al. | 726/2 |

\* cited by examiner

*Primary Examiner*—Thu Ha T Nguyen (57) ABSTRACT

A program provides an electronic message incorporating a visual object therein. The electronic message containing a previously generated unique combination of parameters is transmitted over an electronic network from a platform server to a client. Each time the electronic message is accessed, the unique combination of parameters is transmitted from the client back to the platform server, which generates a visual object of which the current content is determined by dynamic data related to the unique combination of parameters, and transmits the visual object with current content to the client.

20 Claims, 13 Drawing Sheets

E-MAIL WITH VISUAL OBJECT METHOD AND APPARATUS

BACKGROUND OF THE INVENTION

The present invention relates to electronic communication systems and more particularly to a method and apparatus for providing electronic messages for status information.

At present, online companies communicate the status of a process within a company to an end user who initiated the process. Typically, this communication consists of successive e-mails containing the latest process status at the company or e-mail alerts that alert the end user of a status change. Such alerts or status changes typically require the end user to look up certain information in the system of the company.

One example of such a process is the ordering of goods that are sold online. When the end user has placed an order, the end user usually receives an e-mail with the order details as a confirmation of the order. In some cases, the end user also receives order-tracking credentials. When the end user wants to follow the flow or progress of the order, the end user types in the order tracking credentials online and the current status of the order process is displayed.

These conventional methods in the art fail to provide the end user with a simple and effective means of instantly checking the latest status on demand by the user.

Accordingly, it is an object of this invention to provide an electronic message to an end user, which, upon accessing it, instantly displays the latest status of a process.

It is a further object of this invention to provide an electronic message to an end user, which, upon accessing it, instantly displays the latest status of a process, represented by dynamic data.

It is a further object of this invention to provide electronic messages incorporating dynamic data therein.

It is a further object of this invention to provide electronic messages incorporating a visual object therein, which visual object refers to dynamic data.

Other objects will be apparent to those skilled in the art.

SUMMARY OF THE INVENTION

The invention is based on the (repeated) generation by a platform server of a visual object of which the current content is determined by dynamic data related to a combination of unique parameters received from a client at that instant in time. The visual object is preferably referred to from within a message defined in a markup language, such as HTML, WML, XML and the like, and may be an image of any format, such as GIF, JPG, PNG, BMP, TIF and the like, or a (sub)page defined in a markup language, such as in a frame, layer and the like. A preferred embodiment comprises a digitally signed visual object.

The current content of the visual object is determined at the moment of reception by the platform server of the unique parameters from a client and is based on dynamic data. Since the data are dynamic, they may change over time. The content of the visual object may refer to the image data per se and to the image meta-data, which may include a digital signature.

In particular, a program provides an electronic message incorporating a visual object therein. A unique combination of parameters is generated by a platform server and the electronic message, containing the unique combination of parameters is transmitted over an electronic network from the platform server to a client, or alternatively from another server to the client. The unique combination of parameters is sent from the client (back) to the platform server when the electronic message is opened. A visual object of which the current content is determined by dynamic data related to the unique combination of parameters is transmitted from the platform server to the client upon confirmation of the unique combination of parameters. The visual object is automatically updated with the latest data when the user accesses the electronic message or the visual object again.

DETAILED DESCRIPTION OF THE PREFERRED EMBODIMENT

Stated in general terms, the present invention addresses an alternative for successive "status update" electronic messages, by providing the end user a single electronic message, such a an e-mail but not limited thereto, that contains an object that, when viewed in the client, always displays the latest status for that particular end user in the system of the sending company, without the company having to send new electronic messages or the end user having to log in. This object in the electronic message is referred to as a "visual object" as used herein.

Figure 1:
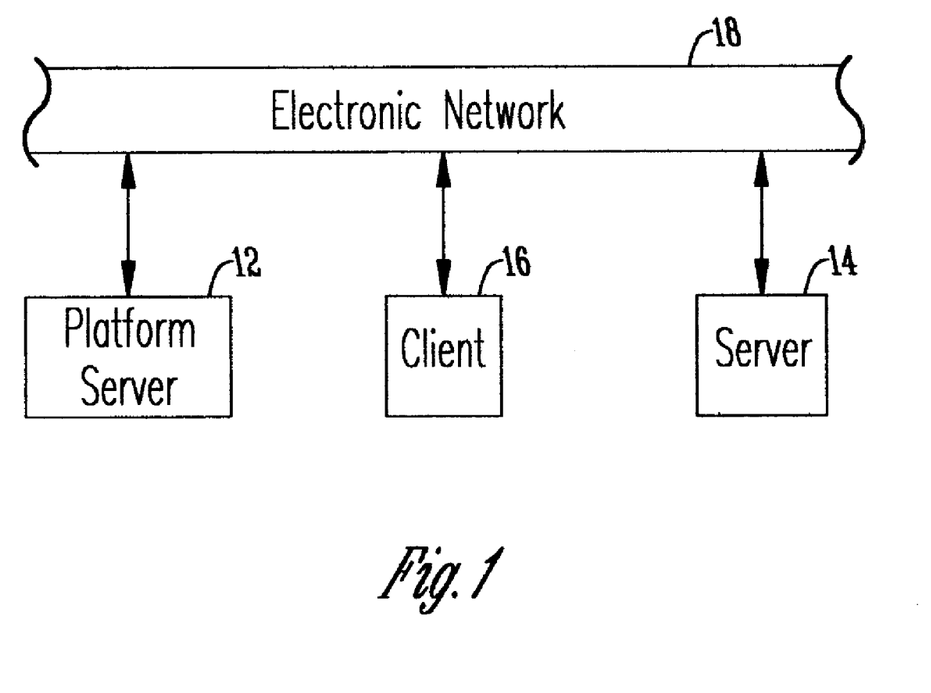
FIG. 1 is a schematic diagram illustrating the operating environment for an embodiment of the present invention.

With reference to FIG. 1, a platform server 12, optionally other server 14 and a client 16 communicate through an electronic network 18. Client 16 is a software program that may interact with the platform server over an electronic network, and may comprise a web client (a browser program) and/or an e-mail client, and/or any other suitable electronic messaging client. Although only one client 16 is shown in FIG. 1, it is to be understood that a plurality of clients 16 and/or servers 14 may be connected to the electronic network 18. The electronic network 18 can be a wireless network, a hard-wired network, an analog network, a digital network, or some combination thereof. An end user interacts with each of the platform server 12, other server 14, and client 16 in the present invention. Typically client 16 is an e-mail client, and server 14 a web server.

Figure 2:
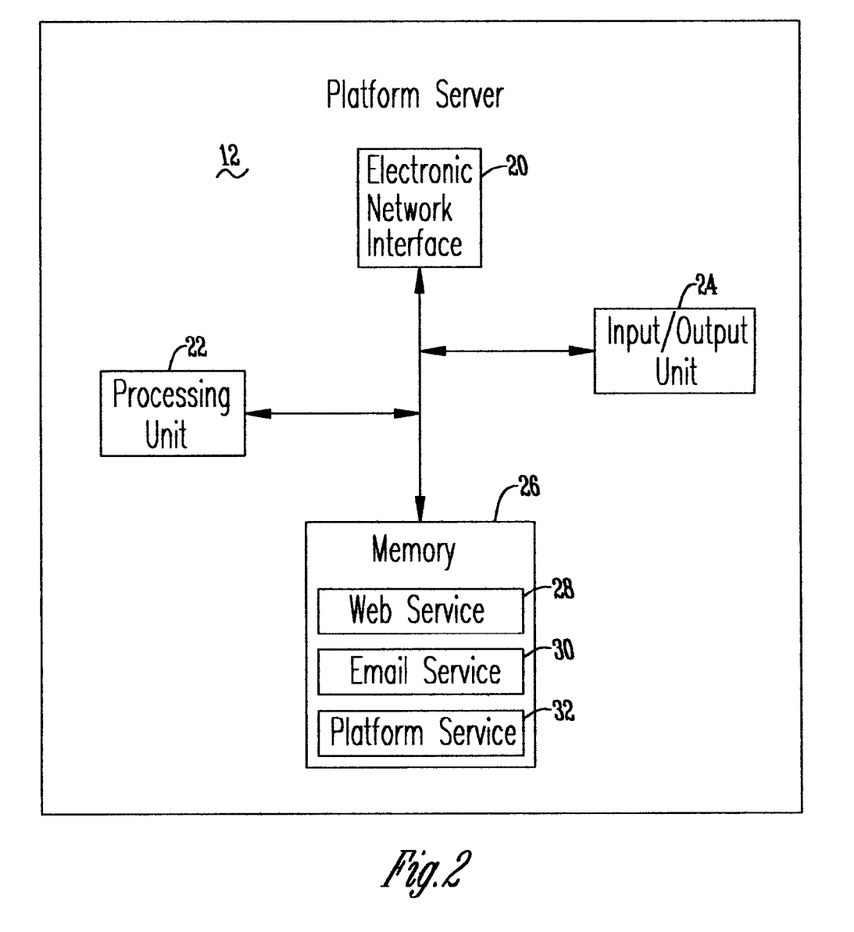
FIG. 2 is a schematic diagram illustrating a platform server of an embodiment of the present invention.

With reference to FIG. 2, the platform server 12 includes an electronic network interface for connecting the platform server 12 to the other server 14, e-mail client 16, and any other desired device or network via the electronic network 18. A processing unit 22 is included in the platform server 12 and performs various operations described in greater detail below. An input/output unit 24 communicates with the processing unit 22 and allows a user to receive output from the processing unit 22 and/or input into the processing unit 22. Those of ordinary skill in the art will appreciate that the input/output device 24 may be provided as multiple devices for separate input and separate output.

A memory 40 communicates with the processing unit 22 and stores code and data necessary for the processing unit 22 to perform the functions of the platform server 12. More specifically, the memory 26 stores multiple programs formed in accordance with the present invention for various functions of the platform server 12, including the following programs: web service 28, e-mail service 30, and platform service 32. The web service 28 program governs the communication between the platform server 12 and a web server, if desired. Likewise, the e-mail service 30 program governs the communication between the platform server 12 and the e-mail client 16. Lastly, the platform service 32 program governs the other operations of the platform server 12, such as communication with another server 14.

Figure 3A:
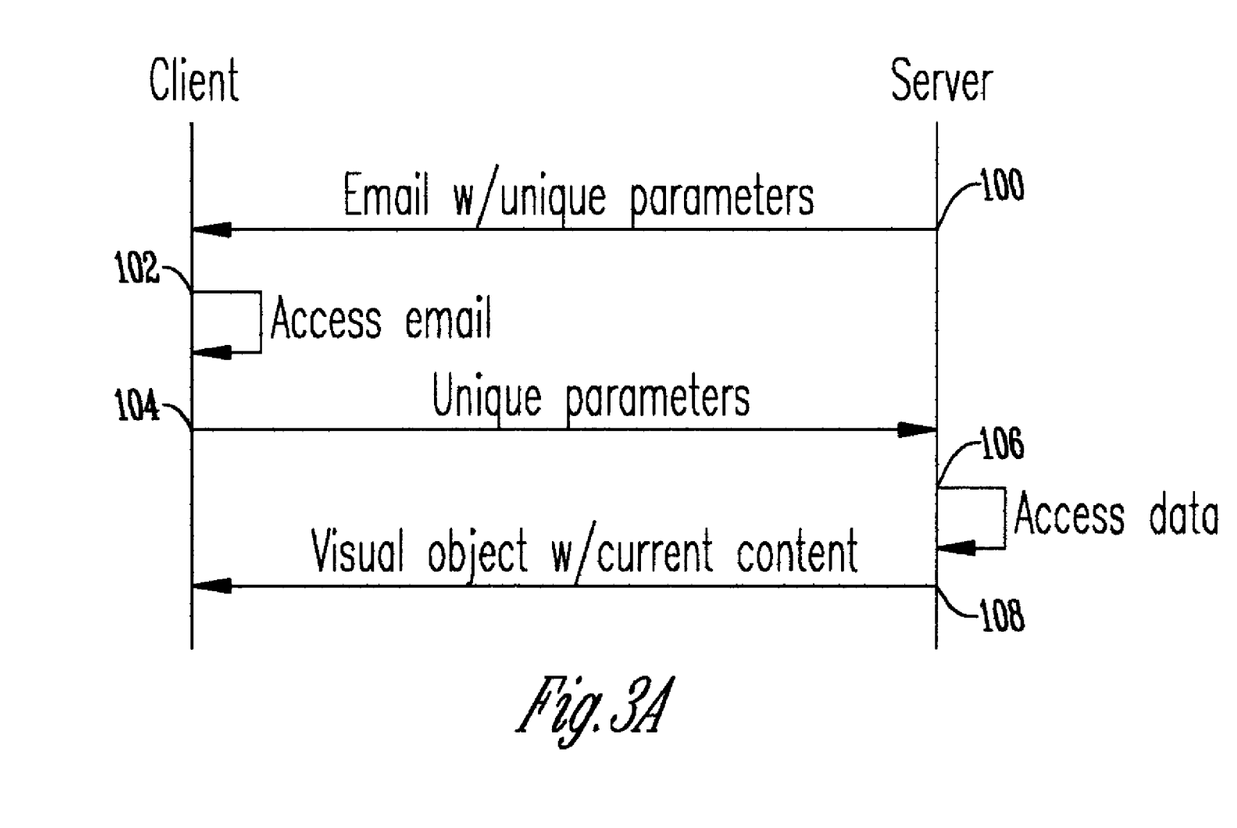
FIG. 3A is a parallel flow chart illustrating the execution of the program logic of the present invention.

With reference to FIG. 3A, the various functional programs of the platform server 12 may be executed as functional steps shown in operation with the client 16. Specifically, according to the invention, platform 12 initiates the process by sending an e-mail containing a unique combination of parameters to the client 16 at step 100. At step 102, client 16 accesses the e-mail, which results in the unique combination of parameters being sent back to the platform server 12 at step 104. The platform server 12 utilizes the unique combination of parameters from step 104 to properly identify and access (in step 106) a visual object of which the current content is determined by dynamic data related to the unique combination of parameters. At step 108, the platform server 12 transmits the visual object with current content over the electronic network to the client 16.

Figure 3B:
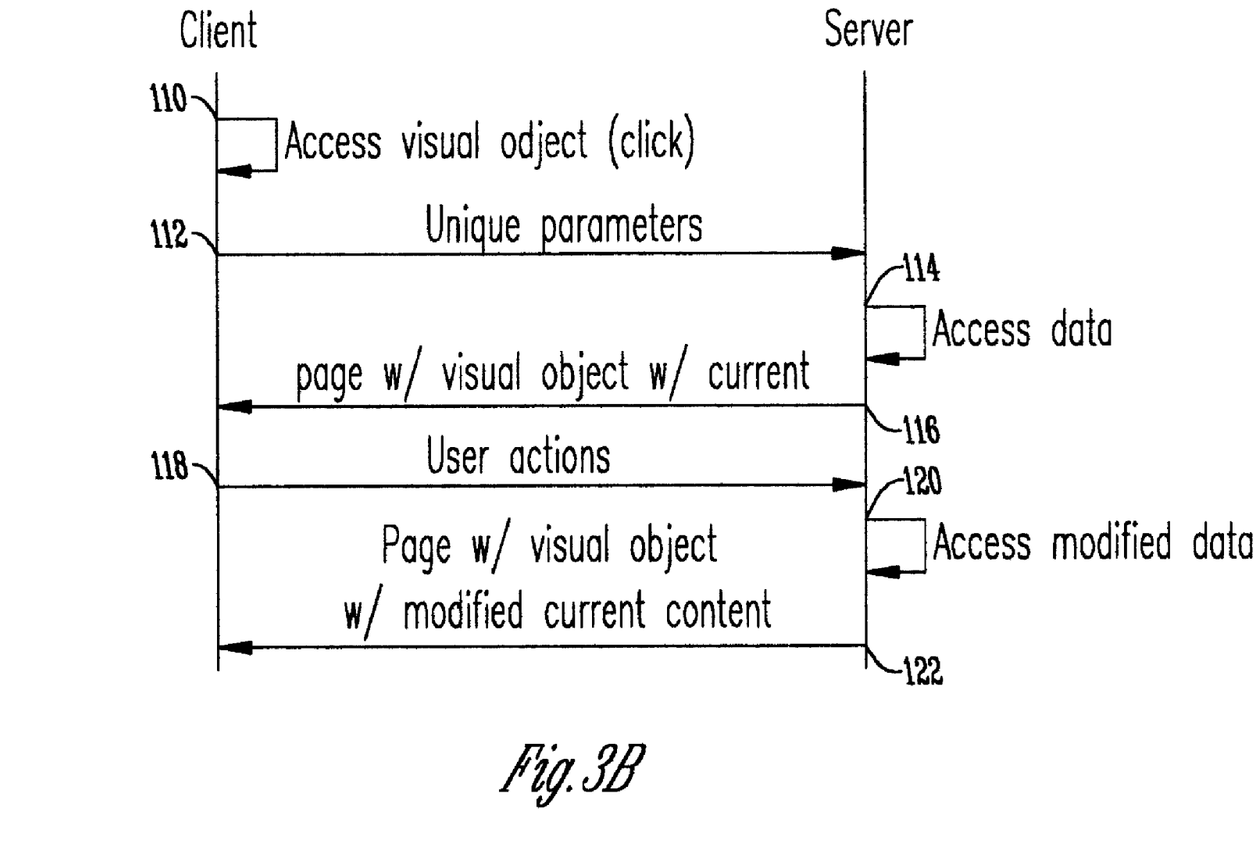
FIG. 3B is a parallel flow chart illustrating the execution of the program logic of a preferred embodiment of the present invention.

In another preferred embodiment, and with reference to FIG. 3B, client 16 or another client accesses the visual object (clicking) at step 110, which results in sending of the unique parameters to the platform server 12 again at step 112. The platform server 12 utilizes the unique combination of parameters from step 112 to properly identify and access (at step 114) a visual object of which the current content is determined by dynamic data related to the unique combination of parameters. At step 116, the platform server 12 transmits a (landing) page (optionally including a visual object) on which the user can take actions and interact with the platform server 12 at step 118. This will most likely result in modified data, which, at step 120 is accessed by the platform server 12, and at step 122 is represented in a (return) page (optionally including a visual object) to client 16.

Figure 3C:
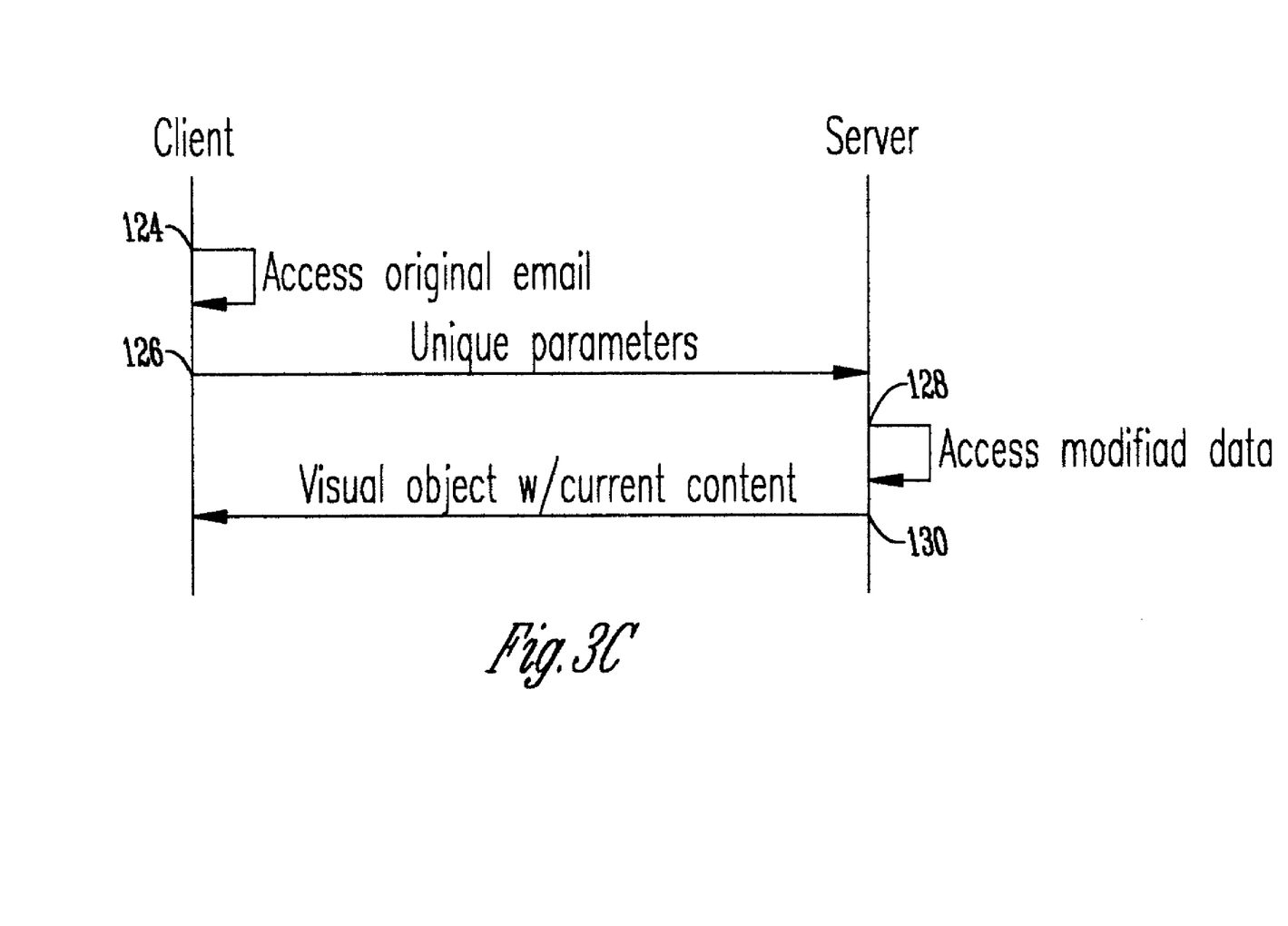
FIG. 3C is a parallel flow chart illustrating the execution of the program logic of a preferred embodiment of the present invention.

In another preferred embodiment, and with reference to FIG. 3C, client 16 or another client accesses the original mail at step 124, in other words the user refreshes the original email, which again results in sending of the unique parameters to the platform server 12 at step 126. At step 128, the platform server 12 accesses the modified data, corresponding to the unique combination of parameters, and at step 130 transmits the visual object with modified current content over the electronic network 18 to the client 16.

Figure 4A:
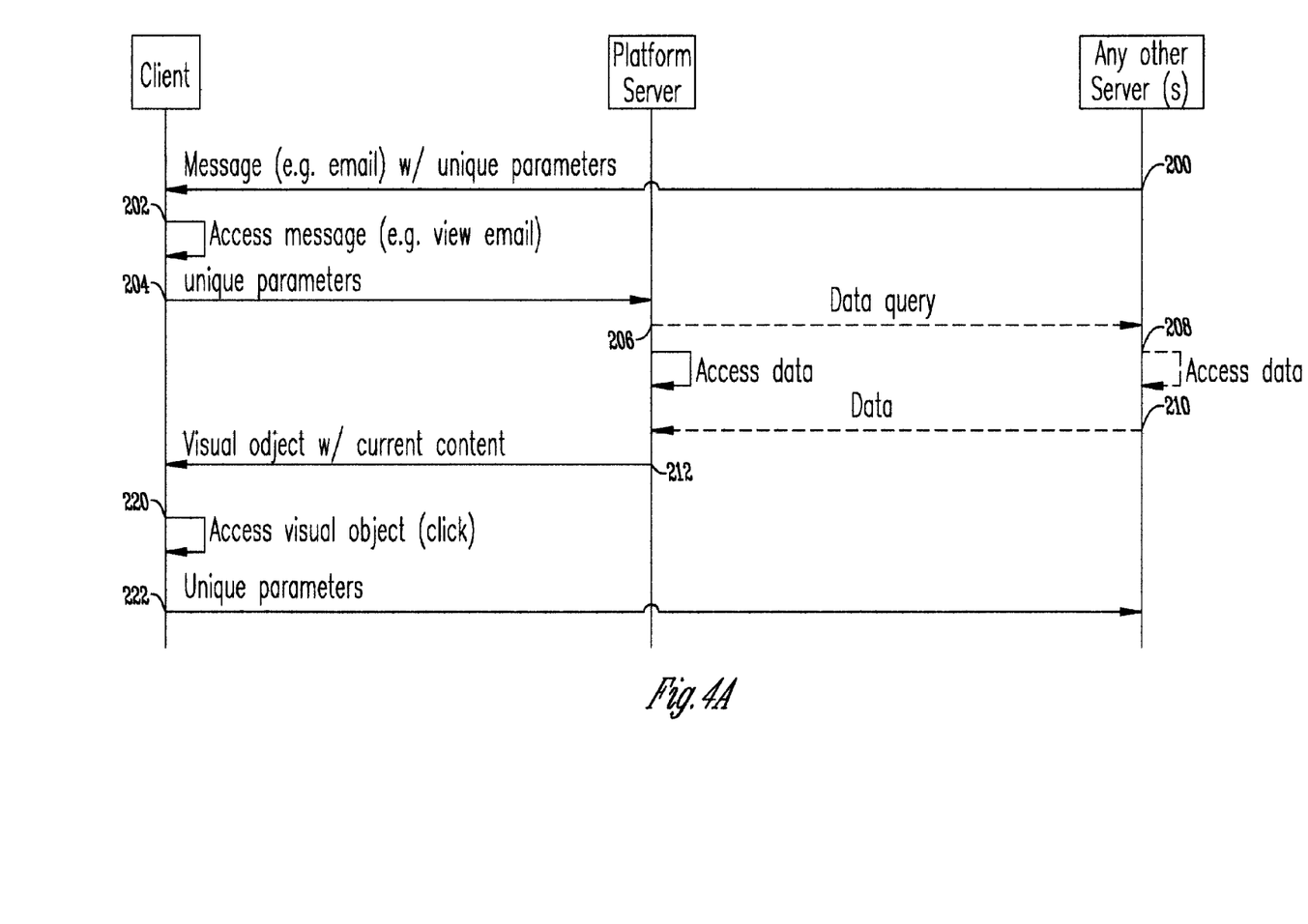
FIG. 4A is a parallel flow chart illustrating the execution of the program logic of the present invention.

In FIG. 4A another embodiment of the method of the invention is shown. Specifically, according to this embodiment of the invention, a third server 14 initiates the process by sending an e-mail containing a unique combination of parameters to the client 16 at step 200. At step 202, client 16 accesses the e-mail, which results in the unique combination of parameters being sent to the platform server 12 at step 204. The platform server 12 utilizes the unique combination of parameters from step 204 to perform a data query at server 14 at step 206. Server 14 properly identifies the request and accesses the data at step 208, where after the data are made accessible to platform server 12 at step 210. At step 212, the platform server 12 transmits the visual object with current content over the electronic network to the client 16.

Figure 4B:
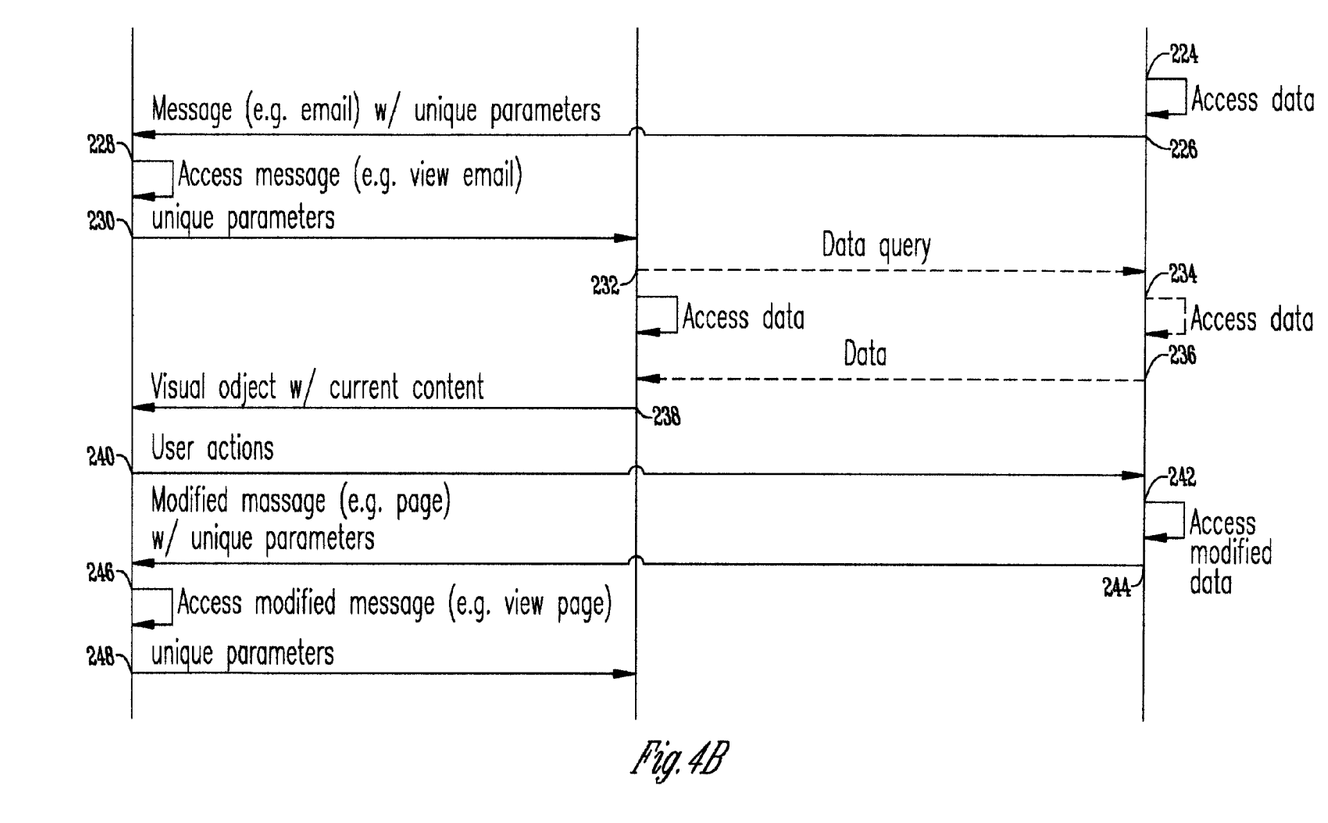
FIG. 4B is a parallel flow chart illustrating the execution of the program logic of a preferred embodiment of the present invention.

In another preferred embodiment, and with reference to FIG. 4B, client 16 or another client accesses the visual object (clicking) at step 220, which results in sending of the unique parameters to another server 14 at step 222. Server 14 accesses the data at step 224 and sends a message, for instance a page, containing the data corresponding to the unique combination of parameters to the client 16 at step 226. At step 228, client 16 accesses the message, which results in the unique combination of parameters being sent back to the platform server 12 at step 230. The platform server 12 utilizes the unique combination of parameters from step 230 to perform a data query at server 14 at step 232. Server 14 properly identifies the request and accesses the data at step 234, where after the data are made accessible to platform server 12 at step 236. As shown, platform server 12 may combine these data with data present on the platform server itself. At step 238, the platform server 12 transmits the visual object with current content over the electronic network to the client 16. Client 16 performs an action, for instance accessing a web page on server 14 at step 240. Server 14 accesses the data, which may now have been modified, at step 242 and sends a message, for instance a page, containing the modified data corresponding to the unique combination of parameters to the client 16 at step 244. At step 246, client 16 accesses the message, which results in the unique combination of parameters being sent back to the platform server 12 at step 248. The platform server 12 utilizes the unique combination of parameters from step 248 to perform a data query at server 14 at step 250. Server 14 properly identifies the request and accesses the data at step 252, where after the data are made accessible to platform server 12 at step 254. At step 256, the platform server 12 transmits the visual object with current content over the electronic network to the client 16. It should be noted that, although reference to a server 14 is made in this example, it should be understood that more servers 14 may be implied. It is for instance possible that in step 222 client 16 actually communicates with a different server 14 than in step 240.

Figure 4C:
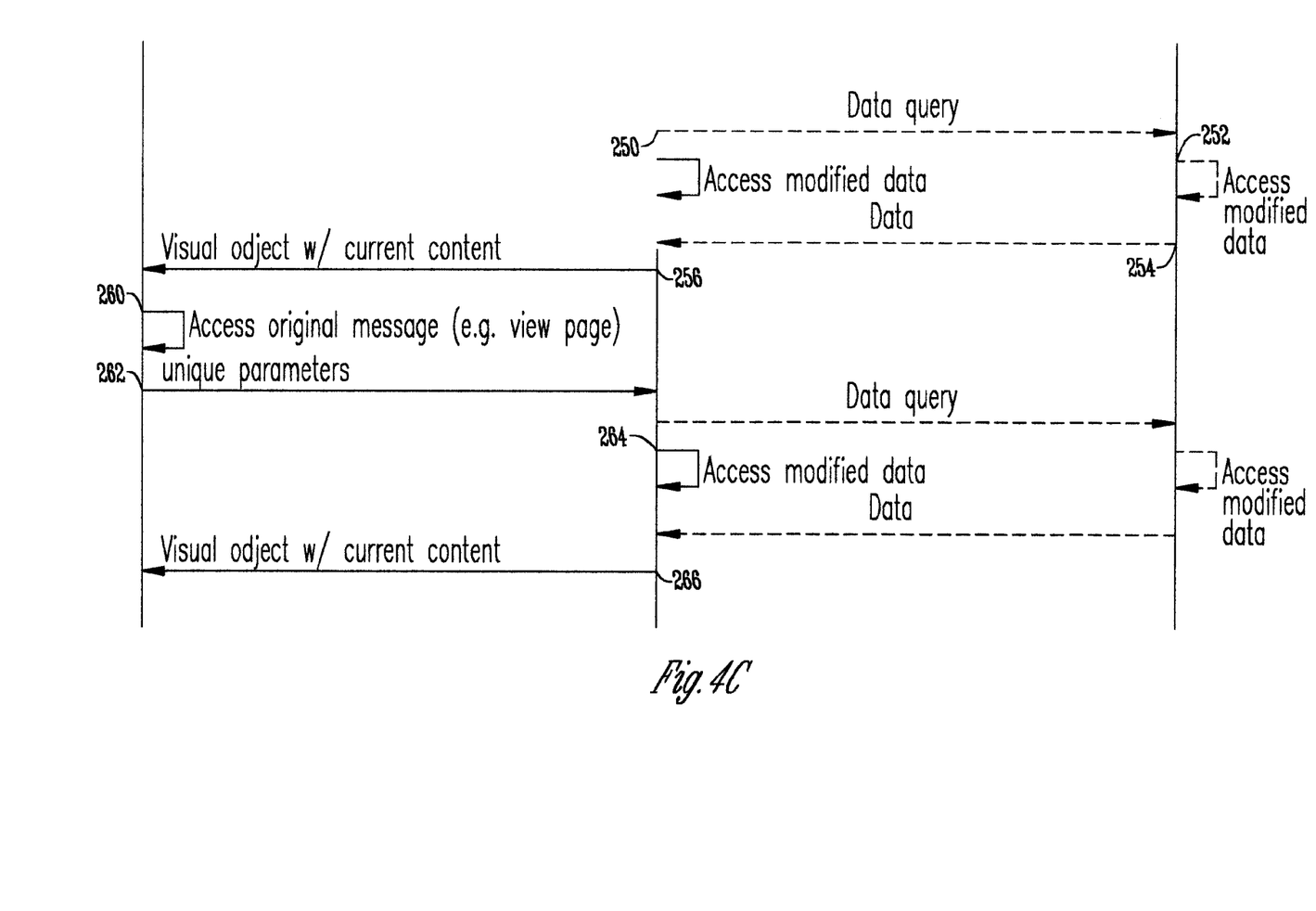
FIG. 4C is a parallel flow chart illustrating the execution of the program logic of a preferred embodiment of the present invention.

In another preferred embodiment, and with reference to FIG. 4C, client 16 or another client accesses the original mail at step 260, in other words the user 'refreshes' the original email, which again results in sending of the unique parameters to the platform server 12 at step 262. At step 264, the platform server 12 accesses the modified data, corresponding to the unique combination of parameters, and at step 266 transmits the visual object with modified current content over the electronic network 18 to the client 16.

Figure 5:
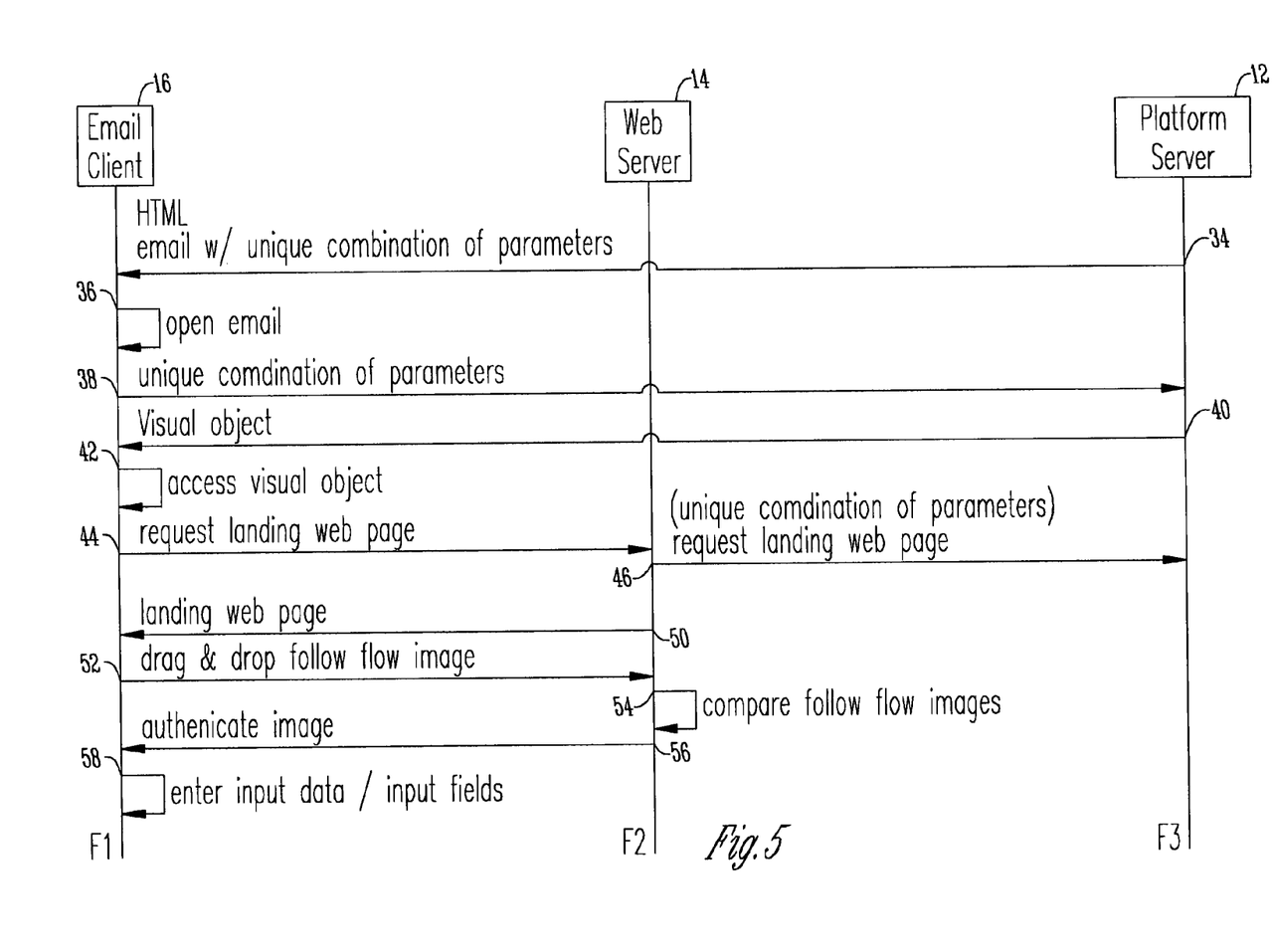
FIG. 5 is a parallel flow chart illustrating the execution of the program logic of the present invention.
Figure 5A:
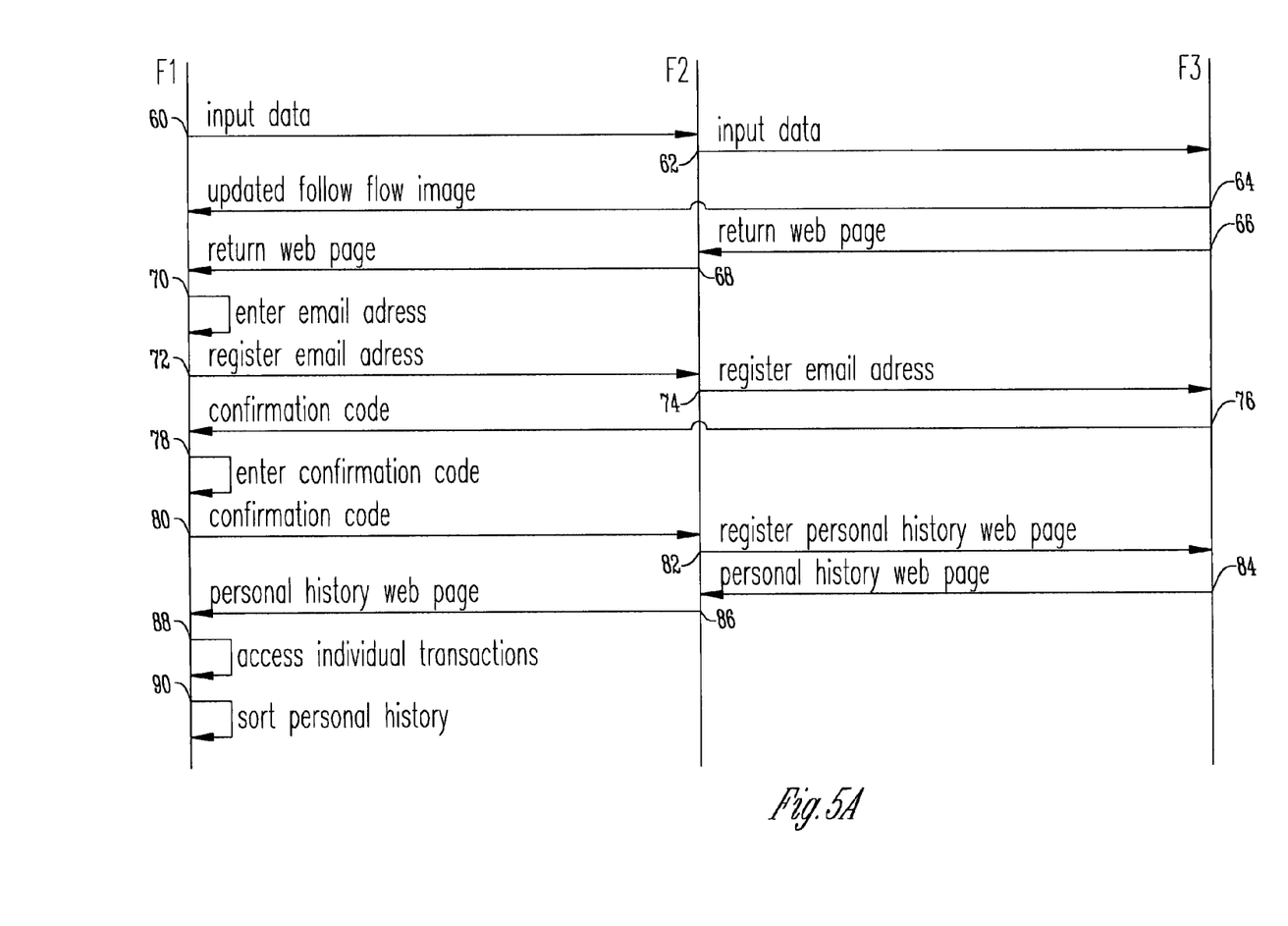
FIG. 5A is a parallel flow chart illustrating the execution of the program logic of the present invention.
Figure 6:
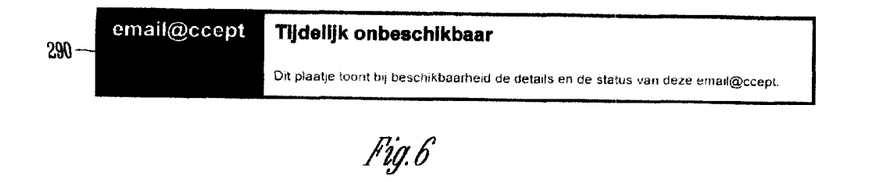
FIG. 6 is a screen shot illustrating an embodiment of the present invention.

With reference to FIG. 5, in a preferred embodiment the various functional programs 28-32 of the platform server 12 may be executed as functional steps shown in operation with the other server 14 and the e-mail client 16. Specifically, platform server 12 initiates the process of the present invention by sending an HTML e-mail containing a unique combination of parameters to the e-mail client 16 at step 34. At step 36, an end user opens the e-mail, resulting in the unique combination of parameters being sent back to the platform server 12 from the e-mail client 16 at step 38. The platform server 12 utilizes the unique combination of parameters from step 38 to properly identify and send a visual object from the platform server 12 to the e-mail client 16 at step 40. If the e-mail client 16 is not online, the e-mail client 16 displays a broken image shown in FIG. 6, informing the recipient of the unavailability of the service until online access is obtained. If online access is available, the visual object of step 40 is displayed by the e-mail client 16, as shown in FIGS. 5 and 5A. The end user may access the visual object by clicking on the visual object at step 42. Such access of the visual object triggers a request for a landing web page to be sent from the e-mail client 16 to the server 14 at step 44. In turn, the server 14 forwards this request landing web page including the unique combination of parameters to the platform server 12 at step 46. When the platform server 12 has matched the unique combination of parameters, the platform server 12 sends a landing web page to the server 14 at step 48. In turn, the server 14 sends the landing web page to the e-mail client 16 at step 50. The end user may now perform a visual authentication of the visual object, as a first visual object is contained in the end user's e-mail, and a second visual object is displayed on the landing web page. Where both visual objects are identical, authentication is confirmed.

Additionally or alternatively, further authentication of the visual object may be performed by the end user dragging and dropping the visual object from the e-mail to the landing web page at step 52. The web server 14 then compares the visual objects at step 54, and displays the results at step 56 either authenticating the image or indicating that the visual object contained in the client e-mail is not authentic.

In embodiments where additional information is desired from the end user, the landing web page will include data input fields. The end user may enter input data into the input fields at step 58, where this input data is transferred from the e-mail client 16 to the web server 14 at step 60. In turn, the web server 14 transfers this input data to the platform server 12 at step 62. With this input data, the platform server 12 sends an updated visual object to the HTML e-mail of the e-mail client 16 at step 62; additionally, the platform server 12 sends a return web page to the web server 14 at step 66. In turn, the web server 14 sends the return web page to the e-mail client 16 at step 68. The return web page is updated with the input data and contains an updated visual object that can be visually compared with the HTML e-mail updated visual object via visual inspection and/or the drag-and-drop authentication described in steps 52-56 above. The above steps 58-68 involving entering input data and updating the visual object can be used for many applications described in greater detail below including voting, payment, and reservations.

End users may monitor their personal account history by registering one or multiple e-mail addresses of the end user with the platform server 12. Specifically, the end user may enter an e-mail address at the e-mail client 16 at step 70, where the e-mail address is sent to the web server 14 at step 72. In turn, a register e-mail address message is sent from the web server 14 to the platform server 12 at step 74. The platform server 12 sends a confirmation code to the e-mail client 16 at step 76. The end user enters the confirmation code at step 78 and sends the confirmation code to the web server 14 at step 80. In turn, the web server 14 requests a personal history web page at step 82, sent to platform server 12. The platform server 12 responds by sending a personal history web page to the web server 14 at step 84. In turn, the web server 14 transfers the personal history web page to the e-mail client 16 at step 86. Now that the end user has access to the personal history web page, the end user may access individual transactions at step 88 by clicking on individual visual objects from the individual historical transactions, and/or sorting the personal history via different categories such as e-mail address, sender, send date, last view date, last click date, last update date, and the like at step 90.

In operation, the visual object is an image, which is dynamically generated by the platform server 12 and contains visualized status information from a data base (such as a data base contained in memory 26 of the platform server 12). In this way, the status information is communicated to the end user viewing the visual object in an e-mail. Status information is typically read-only information where communication is one-way from the platform server 12 to the e-mail client 16. Each visual object is unique as it is only generated when a unique and valid combination of parameters is received by the platform server 12 (for instance at step 38 discussed with respect to FIG. 5 above). This combination of parameters is uniquely related to specific status information and image templates in the memory 26 of platform server 12 and sent to the e-mail address of the end user as part of a personalized HTML e-mail.

Preferably, the visual objects typically have the size of an advertising banner, e.g. 728×90 pixels or 468×60 pixels. For example, see visual object 300 of FIG. 7. A visual object that is generated is signed with an electronic signature. The signature information is based on the actual information displayed in the visual object at the time of viewing using an algorithm and private key. The signature information is added to the meta information of the visual object.

When an HTML e-mail containing a visual object is actually viewed in the e-mail client 16 by the end user (for example, at step 36 of FIG. 5), the unique combination of parameters is sent to the platform server 12 by the e-mail client 16 (see step 38 of FIG. 5) and the e-mail client 16 receives a generated visual object to present to the end user (see step 40 of FIG. 5).

Visual objects are not cached by the e-mail client 16. In this way, the status information in the visual object in the HTML e-mail is refreshed automatically each time the end user views the HTML e-mail in the e-mail client 16.

For viewing visual objects, the end user has to be online. Whenever the end user is offline or the follow flow service is not available at the platform server 12, the HTML e-mail will show a background image informing the recipient of the unavailability of service, as is shown at item 290 of FIG. 6. The unavailability of service image 290 may be cached at the e-mail client 16 for display any time that online service is unavailable.

When a visual object in an HTML e-mail at the e-mail client 16 is clicked by the end user, a browser window is opened and the unique combination of parameters is sent to the platform server 12 by the web server 14 (see step 38 of FIG. 5). The platform server 12 then serves a web page to the web browser, showing an identical visual object as was visible in the e-mail client 16 HTML e-mail received by the end user. This web page can serve as a basis for further actions by the user, such as image authentication, payment, etc.

Authentication of the visual object is useful for two reasons. First, authentication can be used for real time authentic status information and/or post-use authentic status information (e.g. in saved images). In real time, the end user wants to assure the correctness of the information displayed, as the end user may take actions on the information displayed. To ensure authenticity of the source of the visual object in real time, a 128-bit SSL connection from the HTML e-mail to the source is used. When an end user clicks on a visual object, a browser opens and shows a web page showing an identical visual object displaying exactly the same information as displayed in the HTML e-mail in the end user's e-mail client 16. Where the visual object in the HTML e-mail is authentic, the visual object in the HTML e-mail as well as the visual object on the web page is identical.

For instances of post-use, visual objects can assure that a saved visual object is an authentic visual object. For example, a visual object may be submitted as evidence to verify a past transaction. In that case, information in the visual object is authenticated to determine that the information was actually displayed at the time and has not been manipulated. To perform such post-use authentication, each visual object is electronically signed at the time of viewing/generation based on the information in the data base (and thus displayed in the visual object for later post-use authentication). In post-use conflicts, the signature information in the meta-information of the image must match a signature value that is created post-use based on reconstructed data base information at the time of the viewing/generation.

For users having their e-mail configured to only display plain text, the present invention converts the e-mail into plain text and any visual object will be displayed as a hyperlink to the same location as the HREF of the visual object.

Figure 7:
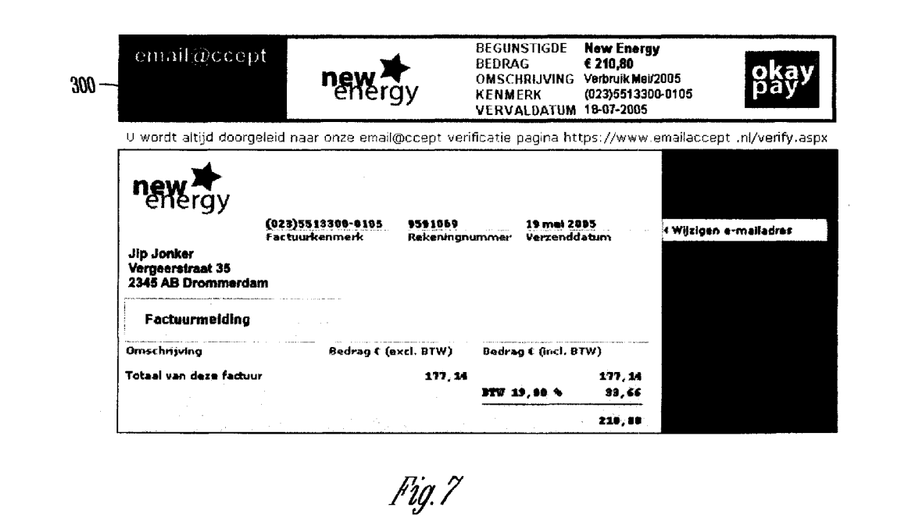
FIG. 7 is a screen shot illustrating an embodiment of the present invention.
Figure 8:
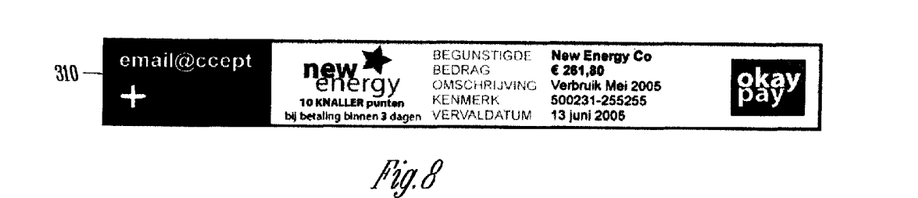
FIG. 8 is a screen shot illustrating an embodiment of the present invention.
Figure 9:
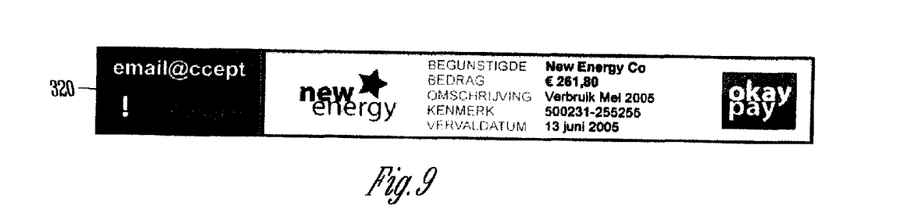
FIG. 9 is a screen shot illustrating an embodiment of the present invention.
Figure 10:
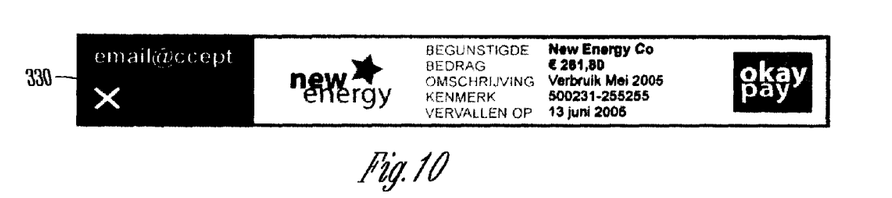
FIG. 10 is a screen shot illustrating an embodiment of the present invention.

As discussed above, the visual object of the present invention can be used for many different applications. For example, the visual object may be used for bill presentment and payment. In this embodiment, the end user receives a personalized HTML e-mail comprising a visual object 300, displaying the payment details, including any expiration date for the bill payment. Such a visual object (hereinafter also referred to as a banner) may typically have the appearance as shown in FIG. 7. The data contained in the banner 300 is generated based on flow definitions, background images, status data of the payment, payment details, method of payment, logo's, sender logo, and the like. All this data may modify during the flow and this may result in a changing content of the message send to the end user. Additionally, the banner may include a related loyalty scheme, such as shown in the visual object 310 of FIG. 8. Also, the visual object may start a visual countdown of "X" days before bill payment expiration to alert the recipient of the approaching expiration date, as shown at visual object 320 of FIG. 9. Additionally or alternatively, the visual object 330 of FIG. 10 may display the fact that the bill payment period has already expired. When the end user clicks on the banner a browser window is opened, showing a landing page related to the banner. The banner may be repeated on this page for confirmation purposes. The end user now initiates payment (if still relevant) to the sender of the e-mail (a merchant for example) and takes all the required actions to confirm the payment. Such remaining required actions may be: selection of bank, selection of payment method, and the like.

Figure 11:
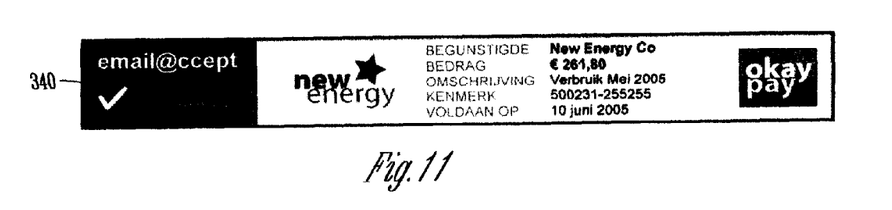
FIG. 11 is a screen shot illustrating an embodiment of the present invention.
Figure 12:
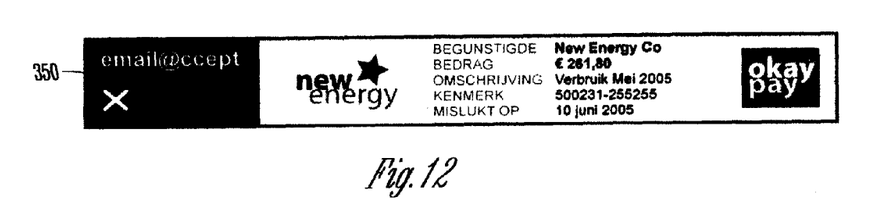
FIG. 12 is a screen shot illustrating an embodiment of the present invention.

When the payment is made, the status of the bill has changed. This may be reflected on a (return) page related to the banner. The banner may be repeated on this page for confirmation purposes. The result/status of the payment may instantly be reflected in the visual object in the end user's HTML e-mail. For example, an accepted payment will instantly be reflected in a visual object 340 shown in FIG. 11. If payment did for some reason not succeed a visual object 350 shown in FIG. 12 will be displayed. Alternatively, any guaranteed payment method with real time status feedback can be used. Using the method of the invention as described above, allows to convey to the end user the current, i.e. latest status of the bill payment each time the end user accesses the original electronic message, containing the bill. There is therefore no need to send additional electronic messages form end user to service provider or vice versa.

Alternatively or additionally, the HTML e-mail contains a specific promotion for the end user and a visual object to initiate participation in the promotion. The promotion could be extremely time sensitive; for example, the visual object may announce a promotion in a particular time period and may even contain an increasing price with decreasing product availability. The recipient may refresh the visual object by reopening the e-mail and/or clicking on the visual object contained in the HTML e-mail. When the recipient clicks the visual object, the recipient is routed to the platform server 12 and finalized the details of the promotion. These finalized details may be: adding desired amount of product, donation amount, delivery address, select payment method, and the like. When the payment is made, the result/status of that promotion and payment will be reflected in the visual object in the end user's HTML e-mail. Any guaranteed payment method with real time status feedback can alternatively be used. From there on, the visual object may change and serve as an order tracking image. Additionally or alternatively, multiple visual objects may be used in a single HTML e-mail for separate purposes. For example, a first visual object may be used for the promotion and a second visual object may be used for tracking a subsequent order based on the promotion.

Figure 13:
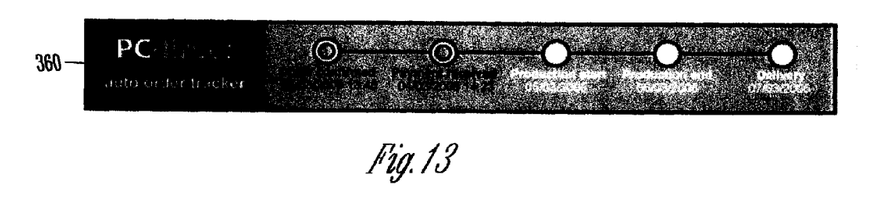
FIG. 13 is a screen shot illustrating an embodiment of the present invention.
Figure 14:
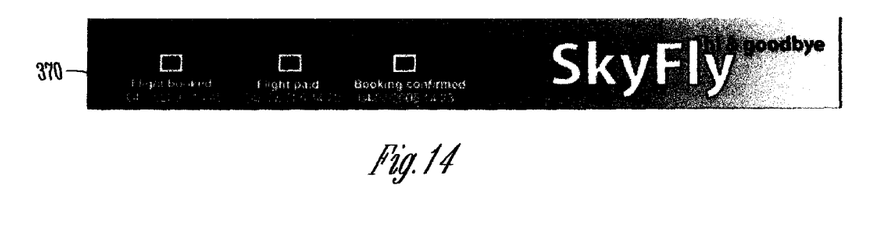
FIG. 14 is a screen shot illustrating an embodiment of the present invention.

Order tracking can relate to orders being made through any channel as long as order confirmation is sent by HTML e-mail. Such orders may be: online orders of goods (manufacturing status and/or logistics status), hotel reservations, airline reservations, customer service tickets, lottery tickets, and the like. One example order tracking visual object 360 is shown in FIG. 13, where an alternative order tracking visual object 370 is shown in FIG. 14.

Figure 15:
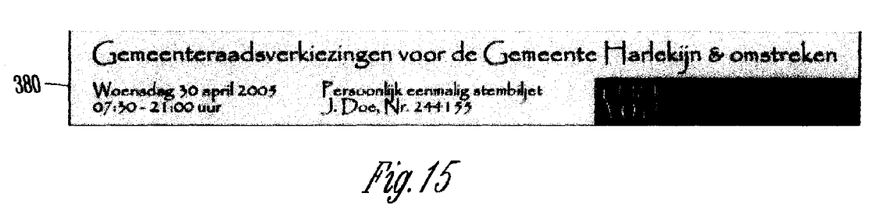
FIG. 15 is a screen shot illustrating an embodiment of the present invention.

An HTML e-mail containing a visual object 380 may also be used for voting (FIG. 15). The visual object 380 is used to cast a single vote. The data base and platform server 12 contains any information about the vote to be cast based on unique parameters, e.g. voting class for shareholders. E-mail address of the end user's will be verified in advance. When the end user clicks the visual object contained in the HTML e-mail, the end user is routed to the platform server 12 and casts the vote. After doing so, the result of the vote is displayed to the voter. When the vote has been cast, the end user may even see the result of the voting in the visual object, after or even during the voting. The same visual object cannot be used to vote again.

Whereas the invention has been shown and described in connection with the embodiments thereof, it will be understood that many modifications, substitutions and additions may be made which are within the intended broad scope of the following claims. From the foregoing, it can be seen that the present invention accomplishes at least all of the stated objectives.

What is claimed is:

1. A method comprising the steps of:
   a) generating a unique combination of parameters by a platform server;
   b) transmitting an electronic message containing the unique combination of parameters over an electronic network from the platform server to a client;
   c) receiving the unique combination of parameters over the electronic network from the client to the platform server;
   d) rendering in real-time by the platform server a visual object of which a content is determined in real time by dynamic data related to the unique combination of parameters, received from the client at that instant in time;
   e) providing a landing webpage when the visual object is accessed, wherein the landing webpage includes a confirmation copy of the accessed visual object;
   f) transmitting updated visual object as rendered by the platform server in real time over the electronic network from the platform server to the client.

2. The method of claim 1, wherein the steps c) to e) are carried out each time the visual object is accessed.

3. The method of claim 1, wherein the steps c) to e) are carried out each time the electronic message is accessed.

4. The method of claim 1, wherein step b) is carried out by another server, to which the unique combination of parameters has been transmitted by the platform server.

5. The method of claim 1, wherein the visual object is digitally signed as a digital signature.

6. The method of claim 5, wherein the digital signature is unaffected by visual object format conversion.

7. The method of claim 6, wherein the digital signature is determined by dynamic data related to the unique combination of parameters.

8. The method of claim 7, further comprising the step of authenticating the accessed visual object via dragging and dropping the accessed visual object onto a confirmation visual object in the landing webpage.

9. The method of claim 1, further comprising the step of entering input data into the landing webpage, resulting in the accessed visual object to be updated via the platform server.

10. The method of claim 1, further comprising the step of providing a personalized history of prior states of the visual object, available from the landing webpage.

11. An apparatus comprising:
    a processor; and
    a memory coupled to the processor, the memory containing programming code executed by the processor adapted to:
    a) generate a unique combination of parameters by a platform server;
    b) transmit an electronic mail containing the unique combination of parameters over an electronic network from the platform server to a client;
    c) receive the unique combination of parameters over the electronic network from the client to the platform server;
    d) render in real-time by the platform server a visual object of which a content is determined in real-time by dynamic data related to the unique combination of parameters, received from the client at that instant in time;
    e) provide a landing webpage when the visual object is accessed, wherein the landing webpage includes a confirmation copy of the accessed visual object;
    f) transmit updated visual object over the electronic network from the platform server to the client upon confirmation of the unique combination of parameters, the updated visual object as rendered by the platform server in real-time.

12. The apparatus of claim 11, wherein the programming code is adapted to carry out steps c) to e) each time the visual object is accessed.

13. The apparatus of claim 11, wherein the programming code is adapted to carry out steps c) to e) each time the electronic message is accessed.

14. The apparatus of claim 11, wherein the programming code is adapted to transmit the unique combination of parameters from the platform server to another server and to let the another server carry out step b).

15. The apparatus of claim 11, wherein the programming code is adapted to digitally sign the visual object, as a digital signature.

16. The apparatus of claim 15, wherein the programming code is adapted to leave the digital signature unaffected by visual object format conversion.

17. The apparatus of claim 16, wherein the programming code is adapted to determine the digital signature by dynamic data related to the unique combination of parameters.

18. The apparatus of claim 17, wherein the programming code is adapted to authenticate the accessed visual object via dragging and dropping the accessed visual object onto a confirmation visual object in the landing webpage.

19. The apparatus of claim 11, wherein the programming code is adapted to enter input data into the landing webpage, resulting in the accessed visual object to be updated via the platform server.

20. The apparatus of claim 11, wherein the programming code is adapted to provide a personalized history of prior states of the visual objects, available from the landing webpage.

* * * * *